March 27, 1951 H. A. BERLINER 2,546,293
VARIABLE AREA TAIL PIPE FOR JET ENGINES
Filed Jan. 24, 1949 2 Sheets-Sheet 2
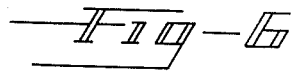
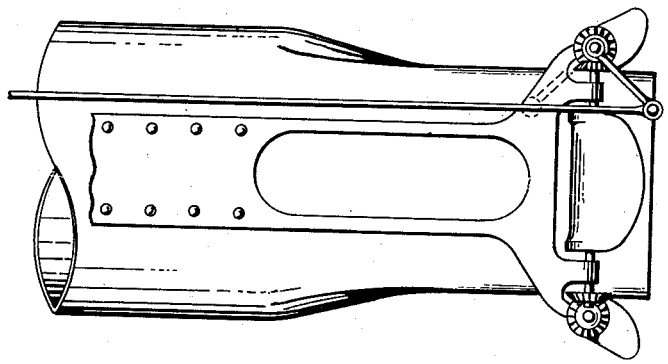
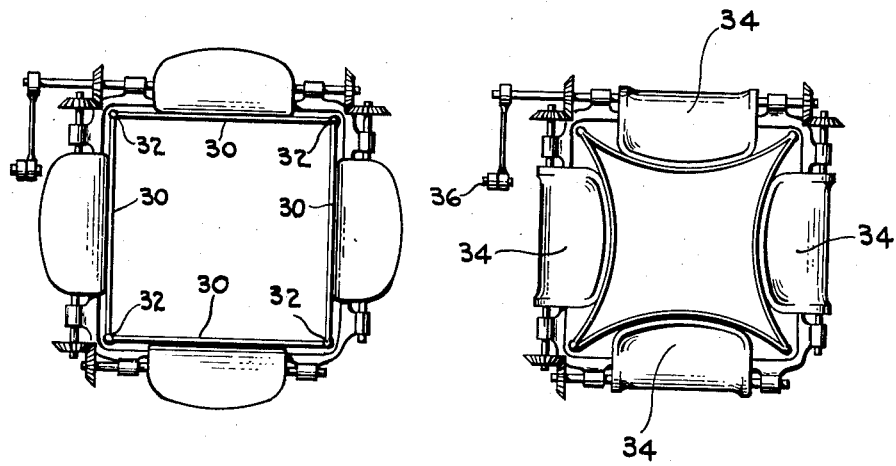
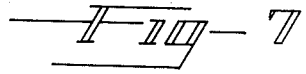 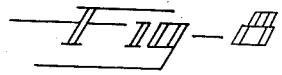
INVENTOR.
HENRY A. BERLINER
BY
Scrivener & Parker

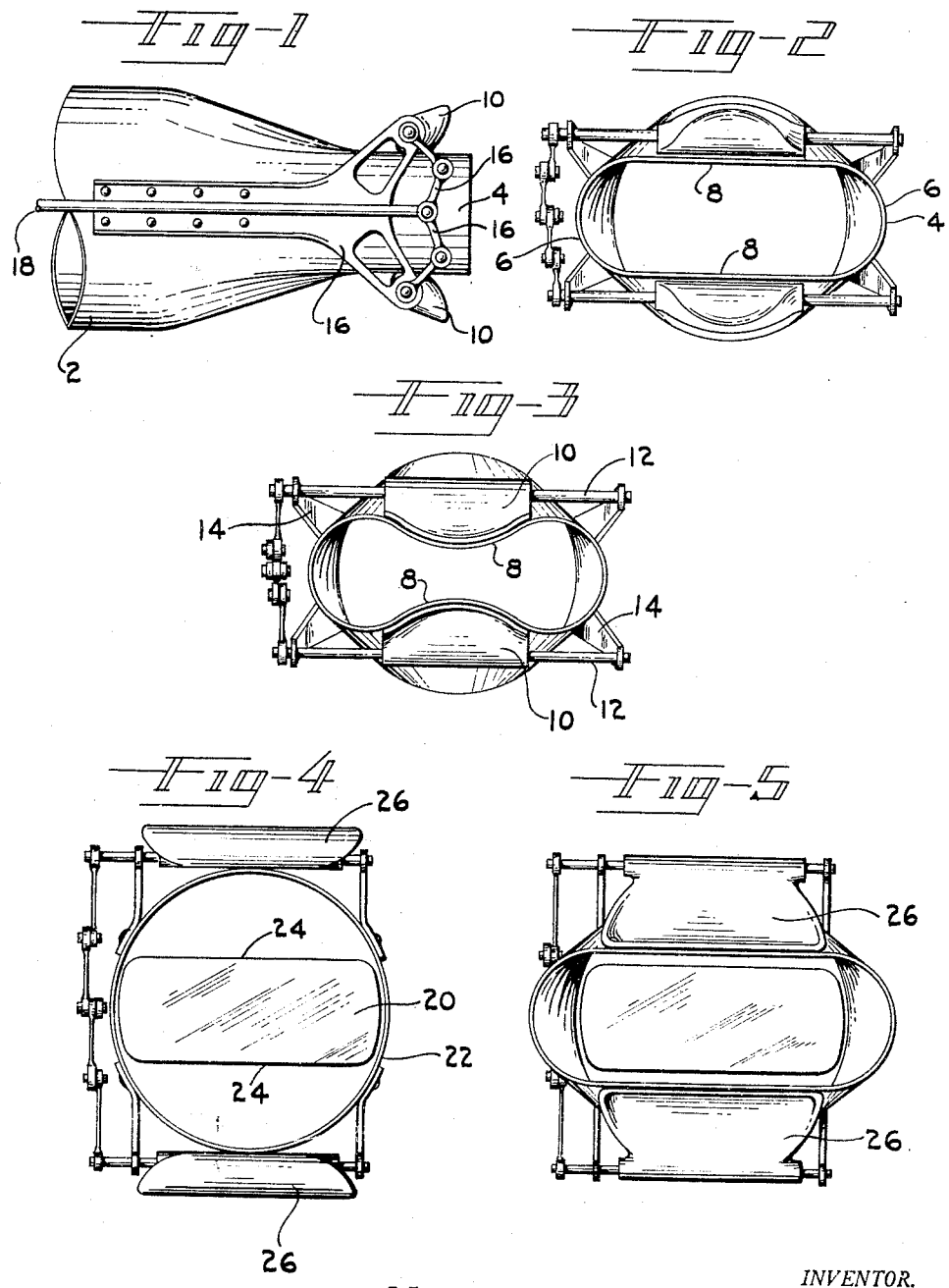

Patented Mar. 27, 1951

2,546,293

UNITED STATES PATENT OFFICE 2,546,293

VARIABLE AREA TAIL PIPE FOR JET ENGINES

Henry A. Berliner, Washington, D. C.

Application January 24, 1949, Serial No. 72,356

1 Claim. (Cl. 60—35.5)

This invention relates broadly to the propulsion of aircraft by means of the reaction of rearwardly-discharged gases, such as is accomplished by jet engines and rockets and, more particularly, has to do with the nozzle or tail-pipe through and from which the gases are discharged. Although not limited to use with turbo-jet engines the invention will be described in this application in connection with such an engine.

In jet engine design and operation it has been established that the jet orifice should vary in size with various operating conditions in order to achieve maximum efficiency and performance under such varied conditions. For example, in one type of jet engine to which this invention may be usefully applied air is taken into the inlet end of the engine duct, compressed, passed into combustion chambers from which it flows to a turbine which drives the compressor and, from there, passes through the tail-pipe to be discharged rearwardly of the aircraft to produce the forward propulsive effort. In some engines now being used additional propulsive effort for take-off, climbing and high-speed maneuvering is secured by burning additional fuel on the delivery side of the turbine in order to raise the temperature of the advancing gas. It has been found that when such a so-called "after-burner" is used, efficiency considerations require that the area of the passage through the tail-pipe be greater than its area under normal cruising conditions when the after-burner is not in use. It has therefore become desirable that means be provided for varying the area of the tail-pipe passage and a number of constructions and arrangements have been proposed for accomplishing this end.

In addition to efficiency considerations, a variable area tail-pipe also provides means for accomplishing another result of great benefit to jet engine operation. This result is due to the fact that at high altitudes a considerable temperature drop occurs which may be as great as 150° below sea level temperature. This causes the entire cycle of the jet engine to operate at a lower temperature than that at which the engine is designed to operate at maximum efficiency. By means of my invention the area of the tail-pipe nozzle may be progressively reduced as the ambient temperature decreases, thus creating a progressively increasing back pressure in the engine which tends to increase the temperature of operation of the engine and consequently maintain it at the temperature at which it operates with maximum efficiency.

Variable area tail-pipes have heretofore been provided and in my co-pending application Serial No. 46,729, filed August 30, 1948, I have disclosed and claimed a tail-pipe having a normally circular section and formed of flexible material whereby it may be deformed to a flattened cross-section to reduce the area thereof. A tail-pipe which is so constructed operates very satisfactorily but is subject to the defect that excessive stresses are set up in the side parts which are worked as the cross-sectional shape is changed. Various expedients have been proposed to reduce these stresses or provide some means to compensate for them.

My present invention has had for its object to provide an improved tail-pipe of the general type described above but which is not so greatly subject to the production of excessive and undesirable stresses in the side parts. This object has been achieved by the provision of the tail-pipe constructions described and claimed in this application.

These various forms of my invention are illustrated in the annexed drawings in which Figs. 1 and 2 are side and end views of a tail-pipe according to one form of my invention, being shown in normal, un-deformed condition;

Fig. 3 corresponds to Fig. 2 but shows the tail-pipe in deformed, reduced-area condition;

Figs. 4 and 5 are end views of a second form of tail-pipe according to my invention, showing it in un-deformed and deformed conditions, respectively;

Figs. 6 and 7 are side and end views, respectively, of a tail-pipe formed in accordance with a third embodiment of the invention, and Fig. 8 corresponds to Fig. 7 but shows the tail-pipe in deformed condition.

As stated hereinbefore, the distortion of a circular tail-pipe by pressure exerted at diametrically opposite points causes the pipe to assume a flattened, elongated shape in cross-section, the percentage of reduction of area being approximately inversely proportional to the distance between the approaching parts. It will be apparent that such a deformation of the pipe will produce great stresses in the diametrically opposite outwardly-arcuate parts of the pipe lying at the lateral sides thereof between the flattened and approaching faces because of the fact that these laterally spaced parts are subjected to a considerable reduction in the radii of curvature thereof.

In one of its aspects my invention contemplates the provision of a tail-pipe which may be deformed in the same manner as that described in order to produce a reduction in area, but in which the radii of curvature of the laterally spaced parts lying between the parts which are being forced toward each other is not materially changed during the entire deformation of the pipe, whereby the stress produced in these parts by such deformation is brought within permissible limits. An embodiment of this form of the invention is disclosed in Figs. 1, 2 and 3 of the drawings and comprises a tail-pipe which may have circular cross-section forwardly of its rear extremity, as shown at 2, but which at its rear end normally has a laterally-elongated, flattened shape in cross-section, such shape being generally that of an ellipse which is flattened along the y axis, all as shown at 4 in Figs. 1 and 2. The laterally opposite parts 6 of this flattened tail-pipe have similar curvatures, the radii of which are much less than the radius of the circular cross-section of the pipe at 2. These outwardly arcuate end portions 6 are connected by generally parallel flat walls 8 which, in the disclosed embodiment, form the upper and lower walls of the tail-pipe adjacent its rear end. In accordance with the invention the reduction in cross-sectional area of the tail-pipe is accomplished by forcing the walls 8 toward each other by some curved means having a large radius, whereby no curves of small radius will be produced during the deformation of the pipe. In the disclosed embodiment such means comprise the cams 10 which are located above and below the walls 8 and which are respectively mounted on shafts 12 which are rotatably journaled on the tail-pipe by means of brackets 14. Levers 16 and an operating rod 18 are provided for rotating the cams in such a way that their cam surfaces move from a normal position out of engagement with the walls 8, as shown in Fig. 2, to an operative position in which the cam surfaces force the walls 8 toward each other as shown in Fig. 3. The cam surfaces have an elongated arcuate configuration in a direction generally parallel to the walls 8 whereby no sharp curves will be produced in the walls as they are deformed. It will be seen that the deformation of the tail-pipe in the described manner will change the shape thereof from the flattened elliptical shape of Fig. 2 to the hour-glass or figure-8 shape of Fig. 3. It will also be seen that such deformation will not materially affect the radii of curvature of the laterally spaced parts 6 of the tail-pipe, thus preventing the creation of undesirable stresses in these parts as the pipe is deformed. The flattened, rear end part of the tail pipe is formed of a material which will resume its normal configuration after deformation, and is therefore resilient. Usual and known sheet metals have this quality and may therefore be used to form the flattened, rear end part of the tail pipe.

In another form which my invention may take and which is disclosed in Figs. 4 and 5 of the drawings, I have provided means for increasing the percentage of reduction of area upon deformation of a tail-pipe of normally circular cross-section. Such means comprise the provision of a solid member within the tail-pipe and extending longitudinally thereof and having an elongated flattened shape which is similar to that of the tail-pipe upon deformation thereof. In the disclosed embodiment this member is illustrated at 20 and is located centrally of the circular tail-pipe 22 with its flattened faces 24 lying between the upper and lower parts of the tail-pipe, which are forced toward each other by the cams 26. In Fig. 4 the parts are shown in their undeformed state while in Fig. 5 the upper and lower parts of the tail-pipe have been forced toward each other and toward the upper and lower flattened surfaces 24 of the member 20. I have found that the provision of the member 20 within the circular tail-pipe materially increases the percentage of reduction of area of the tail-pipe caused by deformation thereof to a flattened condition. Thus the tail-pipe may be made of such size that the area thereof which is effective to pass gases may be made of any desired size necessary to the operation of the airplane. This will normally require a somewhat larger tail-pipe due to the interposition of the member 20 but it will be found that the interposition of this member will cause the area of the tail-pipe effective for the passage of gases to be very materially reduced for a given deformation of the pipe.

In another form which my invention may take and which is disclosed in Figs. 6, 7 and 8, the tail-pipe is of polygonal cross-section having preferably four sides 30 which are articulated at their sides by hinges or other suitable means 32. In accordance with the invention the reduction in tail-pipe area is accomplished by forcing each of the flexible sides inwardly as shown in Fig. 8. This may be effected by means of cams 34 which are located respectively adjacent and outside the walls 30 and which are geared together for operation by means 36 in a manner which will be self-evident.

While I have described and illustrated a number of embodiments of my invention it will be apparent that other embodiments, as well as modifications thereof, may be made without departing in any way from the spirit or scope of the invention for the limits of which reference must be had to the appended claim.

What is claimed is:

A jet propulsion unit comprising a resilient tail pipe of flattened cross-section having two parallel walls connected at their ends by diverging arcuate walls, two pairs of brackets respectively mounted adjacent the upper and lower outer surfaces of said tail pipe, two shafts respectively journaled in said pairs of brackets, each shaft lying adjacent to and parallel with one of the parallel walls of said tail pipe, a cam mounted on each shaft adjacent the mid-point of one of the two parallel walls and having arcuate faces adjacent said pipe, and means for rotating said shafts thereby forcing the cam faces toward each other and into engagement with the tail pipe to deform the cross-section of the tail pipe to substantially figure-of-8 shape to reduce the area of the pipe.

HENRY A. BERLINER.

REFERENCES CITED

The following references are of record in the file of this patent:

UNITED STATES PATENTS

| Number | Name | Date |
| --- | --- | --- |
| 134,469 | Day | Dec. 13, 1872 |
| 296,172 | Holloway | Apr. 1, 1884 |
| 577,362 | Ettlinger | Feb. 16, 1897 |
| 1,363,967 | Fulton | Dec. 28, 1920 |
| 1,852,649 | Gurney | Apr. 5, 1932 |
| 1,865,012 | Jackson | June 28, 1932 |